(12) United States Patent
Yousaf

(10) Patent No.: US 10,798,018 B2
(45) Date of Patent: Oct. 6, 2020

(54) METHOD FOR OPERATING A VIRTUAL NETWORK INFRASTRUCTURE

(71) Applicant: NEC Europe Ltd., Heidelberg (DE)

(72) Inventor: Faqir Zarrar Yousaf, Leimen (DE)

(73) Assignee: NEC CORPORATION, Tokyo (JP)

( * ) Notice: Subject to any disclaimer, the term of this patent is extended or adjusted under 35 U.S.C. 154(b) by 400 days.

(21) Appl. No.: 15/506,792

(22) PCT Filed: Aug. 29, 2014

(86) PCT No.: PCT/EP2014/068438
§ 371 (c)(1),
(2) Date: Feb. 27, 2017

(87) PCT Pub. No.: WO2016/029974
PCT Pub. Date: Mar. 3, 2016

(65) Prior Publication Data
US 2017/0279735 A1    Sep. 28, 2017

(51) Int. Cl.
*H04L 12/911* (2013.01)
*G06F 9/50* (2006.01)
(Continued)

(52) U.S. Cl.
CPC .......... *H04L 47/781* (2013.01); *G06F 9/5077* (2013.01); *G06F 9/5083* (2013.01);
(Continued)

(58) Field of Classification Search
CPC ..... H04L 47/781; H04L 47/70; H04L 47/805; H04L 41/5025; H04L 47/783;
(Continued)

(56) References Cited

U.S. PATENT DOCUMENTS

| 8,099,487 B1 | 1/2012 | Smirnov et al. |
| 2003/0046396 A1* | 3/2003 | Richter ................... G06F 9/505 709/226 |

(Continued)

FOREIGN PATENT DOCUMENTS

EP    2696286 A2    2/2014

OTHER PUBLICATIONS

Xing Pu et al: "Understanding Performance Interference of I/O Workload in Virtualized Cloud Environments", Cloud Computing (Cloud), 2010 IEEE 3$^{rd}$ International Conference on, IEEE, Piscataway, NJ, USA, Jul. 5, 2010 (Jul. 5, 2010), pp. 51-58, XP031739454.

(Continued)

*Primary Examiner* — Umar Cheema
*Assistant Examiner* — Tony Williams
(74) *Attorney, Agent, or Firm* — Leydig, Voit & Mayer, Ltd.

(57) ABSTRACT

A method for operating a virtual network infrastructure, wherein a corresponding physical infrastructure comprises one or more physical infrastructure resources, includes monitoring utilization levels of one or more resource units of the one or more physical infrastructure resources for virtual resources requesting the one or more resource units; calculating average absolute resource utilization values based on the utilization levels for each of the virtual resources; calculating a reference resource of score (RRAS) for each of the one or more resource units of the one or more physical infrastructure resources, wherein the RRAS indicates an impact of the utilization of a reference resource unit on utilization of other resource units on a physical infrastructure resource using the calculated average absolute resource utilization values; and assigning resources by a virtual infrastructure controller (VIC) and/or a VIC-agent on a resource, based on the RRAS for the virtual resources.

16 Claims, 5 Drawing Sheets

(51) Int. Cl.
*H04L 12/927* (2013.01)
*H04L 12/24* (2006.01)

(52) U.S. Cl.
CPC ............ *H04L 47/70* (2013.01); *H04L 47/805* (2013.01); *G06F 2209/506* (2013.01); *G06F 2209/508* (2013.01); *H04L 41/5025* (2013.01); *H04L 47/783* (2013.01)

(58) Field of Classification Search
CPC ................ G06F 9/5077; G06F 9/5083; G06F 2209/506; G06F 2209/508
USPC ......................................................... 709/226
See application file for complete search history.

(56) References Cited

U.S. PATENT DOCUMENTS

| | | | | |
|---|---|---|---|---|
| 2006/0059253 | A1* | 3/2006 | Goodman | G06Q 10/10 709/223 |
| 2010/0332883 | A1* | 12/2010 | Saxe | G06F 1/3203 713/324 |
| 2013/0304903 | A1* | 11/2013 | Mick | H04L 43/0817 709/224 |
| 2014/0241247 | A1* | 8/2014 | Kempf | H04L 12/4633 370/328 |

OTHER PUBLICATIONS

Pu Xing et al: "Who Is Your Neighbor: Net I/O Performance Interference in Virtualized Clouds", IEEE Transactions on Services Computing IEEE, USA, vol. 6, No. 3, Jul. 1, 2013 (Jul. 1, 2013), pp. 314-329, XP011525446.

Ron C Chiang et al: "TRACON: Interference-aware scheduling for data-intensive applications in virtualized environments", High Performance Computing, Networking, Storage and Analysis (SC), 2011 International Conference for, IEEE, Nov. 12, 2011 (Nov. 12, 2011), pp. 1-12, XP032081452.

* cited by examiner

METHOD FOR OPERATING A VIRTUAL NETWORK INFRASTRUCTURE

CROSS REFERENCE TO RELATED APPLICATIONS

This application is a U.S. National Phase application under 35 U.S.C. §371 of International Application No. PCT/EP/2014/068438, filed on Aug. 29, 2014. The international application was published in English on Mar. 3, 2016 as WO 2016/029974 A1 under PCT Article 21(2).

FIELD

The present invention relates to a method for operating a virtual network infrastructure, preferably in the form of a software-defined network, a cloud infrastructure, and/or a data center.

The present invention further relates to a system for operating a virtual network infrastructure, preferably in the form of a software-defined network, a cloud infrastructure, and/or a data center.

BACKGROUND

A data center infrastructure is nowadays used for providing cloud services by leveraging virtualization techniques and methods. A data center infrastructure usually comprises a row of racks occupied by an array of servers which are called physical machines. These physical machines are interconnected with each other and with an external network like an internet, intranet, a corporate network or the like via the data center network infrastructure. A cloud service provider usually provides application services or application functions which are hosted on virtual machines as virtual applications or virtual functions. These virtual machines are usually hosted on the physical machines. A virtual machine is an abstraction of a physical machine being assigned a specific slice of underlying resources of the physical machine such as processing, memory, input/output module, storage, etc.

A single physical machine can have tens to hundreds of virtual machines running on it as long as the underlying physical resources of the physical machine are able to satisfy the resource requirements demanded by the work load of the virtual applications or functions running on the respective virtual machines. Usually the physical machine has a virtual machine monitor managing the multiple virtual machines on the physical machines and monitoring their corresponding resource consumption.

Conventionally the cloud service provider offers a set or a menu of so-called "flavors" from which a customer usually in form of an application function provider can choose from in order to host its set of applications or functions on a data center infrastructure. The term "flavor" in OpenStack terminology refers to available hardware configurations for a virtual machine. Each of the "flavors" has a unique combination of disc space, memory capacity and priority of the central processing unit time, i.e. processing requirements. The application/function provider chooses the flavor that matches best the operational and workload requirements of the respective application function. Once the "flavor" has been selected a cloud infrastructure controller or an orchestrator entity inside the data center then selects one or more suitable physical machines which fulfill best the stipulated requirements of the application/function provider and one or more suitable virtual machines are instantiated on which the specific application function(s) can be hosted. The selection of suitable physical machines may also take into account specific constrains set by the application/function provider that may be unique to the application providers operational requirements.

To address the problem of placement for virtual machines U.S. Pat. No. 8,099,487 B1 discloses a system and a method for determining an optimized placement for a virtual machine in a virtualized environment on the basis of available performance matrix in which the virtualized environment includes at least two virtual machines each hosting at least one application and at least one virtualized hardware system managed by at least one virtualization server. In more detail a load balancing technique is disclosed by making virtual machine migration decisions being based on balancing metric wherein the balancing metric is provided in form of a utilization value of some specific resource unit or a set of them which the system is able to monitor. Iteratively the virtual machines are migrated based on the balancing metric for achieving load balance. Further only migration operations are possible, i.e. the making of migration decisions.

In the non-patent literature of Sudevalayam, S.; Kulkarni, P., "Affinity-Aware Modeling of CPU Usage for Provisioning Virtualized Applications," International Conference on Cloud Computing (CLOUD), 2011 IEEE, pp. 139,146, 4-9 Jul. 2011 it is disclosed that virtual machine placement decisions may be based on resource utilization information of hosting intercommunicating virtual machines on same or different physical machines. The virtual machines placement decisions are based on predicting estimated central processing unit utilization and therefore benchmarking of the central processing unit utilization is performed with respect to different work loads through repeated experiments.

However, the aforementioned systems and methods have the following deficiencies leading to reduced performance. For example in case the application/function provider is required to choose from a discrete set of flavors the application/function provider is forced to choose a flavor that may usually exceed his requirements and hence will not only increase the cost of hosting but may also result in the under-utilization of the underlying resources that are associated with the particular flavor. The unutilized portion of the assigned resources are also called "resource black-hole".

Further such a process of selected flavors does not take into account unforeseen traffic or load surges that may have a serious impact on the quality of service QoS of the respective hosted application functions. The system may then be forced to perform cost-intensive operations of virtual machine migration, cloning, scaling, etc. to meet the traffic demands.

On the other hand also unforeseen traffic reductions are not taken into account that may result in underutilization of assigned resources, i.e. resource black-holes are accumulated and also leading to energy consumption higher than needed.

Even further due to the resource allocation and the policy of ensuring resource isolation between virtual machines on the same resource, sharing and run-time/dynamic (re)allocation and/or (re)organization of unused allotted capacities of the underlying physical resources is prevented.

SUMMARY

In an embodiment, the present invention provides a method for operating a virtual network infrastructure, wherein a corresponding physical infrastructure comprises one or more physical infrastructure resources. The method includes monitoring utilization levels of one or more resource units of the one or more physical infrastructure resources for virtual resources requesting the one or more resource units; calculating average absolute resource utilization values based on the utilization levels for each of the virtual resources; calculating a reference resource affinity score (RRAS) for each of the one or more resource units of the one or more physical infrastructure resources, wherein the RRAS indicates an impact of the utilization of a reference resource unit on utilization of other resource units on a physical infrastructure resource using the calculated average absolute resource utilization values; and assigning resources by a virtual infrastructure controller (VIC) and/or a VIC-agent on a resource, based on the RRAS for the virtual resources.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
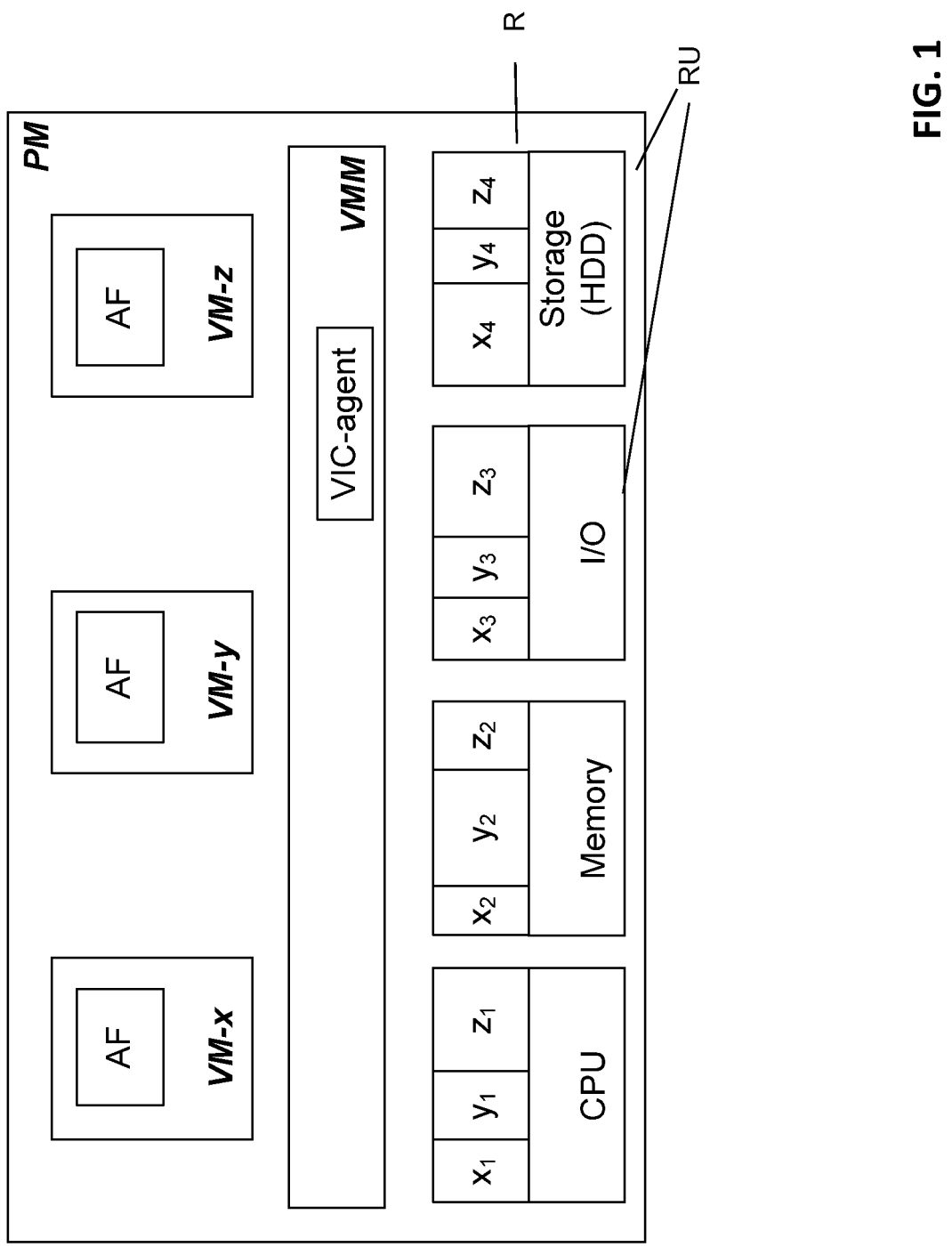
FIG. 1 shows a part of a system according to a first embodiment of the present invention.

Although applicable to any type of virtualized infrastructure in general, the present invention will be described with regard to a data center infrastructure.

Prior art methods and systems have the disadvantage of a non-optimized utilization of underlying resources and under high load surge conditions they may lead to specific costly management operations such as migration, cloning or simple and/or vertical scaling on the virtual machines in order to meet and/or handle these load conditions. A further disadvantage is that these management actions are costly and usually result in service degradation and non-optimum utilization of the resources.

A method and a system are described herein for operating a virtual network infrastructure to enable a more optimized utilization of assigned and available resources. Furthermore, a method and a system are described herein for operating a virtual network infrastructure to enable dynamic and precise (re)assignment, (re)distribution, (re)allocation, and/or (re)organization or sharing of resources among virtual instances on the same physical machine at runtime at a more granular level. Even further, a method and a system are described herein for operating a virtual network infrastructure to minimize the occurrence of a triggering of costly virtual machine management operations like migration, cloning, etc. by a synchronized virtual infrastructure controller. Moreover, a method and a system are described herein for operating virtual network infrastructure to enable optimized management operations of the virtual infrastructure controller and/or of a corresponding monitoring entity in large scale data centers.

A method is described herein for operating a virtual network infrastructure, preferably in form of a software-defined network, a cloud infrastructure and/or a data center, wherein the physical infrastructure comprises one or more resources, is defined. The method is characterized by the steps of a) Monitoring utilization levels of one or more resource units of said resources for virtual resources requesting said resource units, b) Calculating average absolute resource utilization values based on said utilization levels for each virtual resource, c) Calculating a reference resource affinity score—RRAS—for each resource unit, wherein said RRAS indicates at least how much the utilization of a reference resource unit impacts the utilization of other resource units on a resource, using said average absolute resource utilization values, and d) Assigning of resources by an entity, preferably a virtual infrastructure controller VIC and/or a VIC-agent on a resource, based on said RRAS for virtual resources.

A system is described herein for operating a virtual network infrastructure, preferably in form of a software-defined network, a cloud infrastructure and/or a data center, wherein the physical infrastructure comprises one or more resources, and a virtual infrastructure controller VIC for controlling virtual resources is defined. The system is characterized by a VIC-agent entity adapted to monitor utilization levels of one or more resource units of said resources for virtual resources requesting said resource units, a utilization value entity adapted to calculate average absolute resource utilization values based on said utilization levels for each virtual resource, a calculation entity adapted to calculate a reference resource affinity score RRAS for each resource unit, wherein said RRAS indicates at least how much the utilization of a reference resource unit impacts the utilization of other resource units on a resource, using said average absolute resource utilization values, and an entity preferably the VIC and/or the VIC-agent is adapted to assign resources based on said RRAS for virtual resources.

According to embodiments of the invention, the ability of a local virtual infrastructure management entity and/or a global virtual infrastructure management entity in exercising virtual infrastructure management decisions is rendered with greater precision by deriving the reference resource affinity scores. For example the VIC assigns resources based on said RRAS for virtual resources at a global scale, and the VIC-agent reassigns and/or redistributes unused portions of resource units within a resource at a local scale.

According to embodiments of the invention more optimal decisions regarding virtual machine management tasks like placement, deployment, instantiation, resource management, migration, cloning, horizontal and/or vertical scaling, etc. are enabled.

According to embodiments of the invention a more efficient operator control and/or management policy depending on the virtual infrastructure is enabled.

According to embodiments of the invention a method and a system can be easily integrated in conventional methods and systems and provide therefore a cost-effective operation and implementation.

According to embodiments of the invention short-term and long-term virtual machine management decisions can be enabled.

According to embodiments of the invention flexibility is enhanced since a rigid pinning of resources to specific virtual machine instances is avoided.

According to embodiments of the invention an optimum utilization of assigned and available resources is enabled.

According to embodiments of the invention the number of occurrences of triggering costly virtual machine management operations is significantly reduced.

According to embodiments of the invention capabilities of data centers and/or cloud resource analytic algorithms or methods is enhanced by providing precise correlations between different resource units.

According to embodiments of the invention quality of service can be maintained.

According to embodiments of the invention a fine granular and precise view of the degree of affinity or correlation of a resource unit or a plurality of resource units compared with the reference resource unit is enabled.

Embodiments of the present invention enable, for example, a control and management entity either local or global in a virtualized infrastructure and/or in a SDN-based network to compute and derive so-called affinity scores for a plurality of resource units with reference to a specific resource unit for each individual virtual machine instance. This affinity score referred to as reference resource affinity score RRAS enables the controlling management entity to perform precise and efficient resource tailoring or dimensioning and to optimize its decisions and operations related to the management of the virtualized network infrastructure.

With respect to embodiments of the present invention, the term "affinity" can refer to a correlation between different entities, i.e. resource units. The affinity value or "affinity score" may be a vector quantity indicating the level or degree of dependence of one or more resource units on a reference resource unit. Information depicting the correlation or affinity between different resource units with reference to a specified key reference unit under different workload conditions is derived and communicated. This derived information reference resource affinity score RRAS provides an insight as to at least how much the utilization of one reference unit will effect or impact other reference units. The RRAS may be as mentioned above a vector quantity expressing the correlation or the level of dependence of an individual resource unit on the reference resource unit in terms of utilization. The RRAS value for a particular reference unit indicates to what degree does its utilization depend on the utilization of the reference unit. In further other words to what extent or level the utilization of the reference resource unit incur the utilization in the other resource units or how dependent is a resource unit with respect to the reference resource unit in terms of utilization.

According to a preferred embodiment the utilization levels are recorded over a certain adaptable time period. This enhances on the one hand the flexibility since the time period for recording the utilization levels may be adapted due to the needs of an operator. Further, on the other hand when being recorded the utilization levels may for example be combined, for example averaged allowing to smooth out utilization peaks, etc.

According to a further preferred embodiment a RRAS-report is provided including the utilization levels of the resource units on the respective resource for all virtual resources. Such a RRAS-report includes therefore fine granular information which can be incorporated by a global or local resource management entity to make more precise decisions in terms of optimum resource management under different work load conditions, for example at the infrastructure level or server level respectively.

According to a further preferred embodiment a history of the RRAS-reports is maintained in each resource and/or transmitted to the VIC, wherein the RRAS-reports are stored in a RRAS-repository inside the VIC. For example when the RRAS-reports are maintained in each resource then this resource can be used locally to administer appropriate management actions within a resource or physical machine such as runtime resource sharing. When being transmitted to the VIC, the RRAS-reports are stored in a RRAS-repository inside the VIC and can be used for appropriate management decisions by the VIC at an infrastructure level.

According to a further preferred embodiment step c) is only performed for specific resources and/or resource units. This further enhances the flexibility since an operator for example may exclude, group or combine certain resource units. Thus, bandwidth and computational resources are saved respectively and not wasted, since only resource units of interest are taken into account when performing step c).

According to a further preferred embodiment an affinity signature—AS—for one or more resource units is calculated based on actual and historical RRAS, wherein the AS indicates a long-term trend of the affinity of a resource unit for a corresponding virtual resource. Such historical/past records of RRAS values, for example obtainable by storing the corresponding RRAS reports enables a VIC or another entity to derive the AS of resource units with respect to a reference resource unit for the respective virtual machines. The AS provides information about a long-term affinity trend of a reference resource unit for a specific virtual machine and therefore enabling an operator to make long-term decisions for resources on the physical machines.

According to a further preferred embodiment step d) is performed based on one or more AS. This enables an even more precise assigning of resources and therefore management of the virtual network infrastructure.

According to a further preferred embodiment a time indication is attached to the RRAS and/or AS when calculating the RRAS and/or AS. By attaching or assigning a time indication, for example the time of the day, the RRAS report enables to provide e.g. the times at which the affinity is the strongest or weakest. This enables an even more optimal management of resources at different times. For example a routing virtual network function VNF may have an AS indicating a strong affinity of the input/output resource unit and a weak affinity of the memory resource unit during specific times of a day when the routing VNF is involved in routing and/or forwarding user plane data traffic. Another example is when for machine-to-machine applications the control plane traffic exceeds the user plane traffic. This impacts a higher demand on memory resource units for maintaining states than on the input/output resource unit. Therefore, rerouting of machine-to-machine traffic over this routing virtual network function VNF can be administered to maximal utilize the available resources. Additionally the AS information can be used for power savings, where the virtual network function VNF indicating weaker affinity to allotted resources can be consolidated on fewer servers thereby preserving resources and energy.

According to a further preferred embodiment the RRAS-reports are provided periodically and/or event based, preferably solicited by the VIC. When RRAS-reports are provided periodically, e.g. transmitted to the VIC a precise analysis for assigning resources is enabled. When being provided event-based, for example RRAS-reports may be solicited by and transmitted to the corresponding management entity whenever needed. Further, such RRAS-reports with RRAS values can be provided if a specified utilization threshold for a particular resource unit is exceeded.

According to a further preferred embodiment a RRAS is calculated by using a difference between the average absolute resource utilization for a reference resource unit and the average absolute resource utilization of another resource unit. This enables a very fast and simple way to determine RRAS.

According to a further preferred embodiment a RRAS is calculated by using the absolute difference between the percentage utilization for a reference resource unit and the percentage utilization of another resource unit. This enables another simple and easy to implement way to calculate RRAS.

According to a further preferred embodiment the RRAS indicates also how the utilization of a reference resource unit impacts the utilization of other resource units on a resource. This further enhances the preciseness of management decisions since not only how much the influence of a reference resource unit but also how the utilization of a reference resource unit impacts the utilization of other resource units when a resource is enabled.

According to a further preferred embodiment a positive value for the RRAS of a reference resource unit indicates that the utilization of said reference resource unit will result in an increased utilization of another resource unit above the average utilization level of the reference resource unit and a negative value for the RRAS of a reference resource unit indicates that the utilization of said reference resource unit will result in a decreased utilization of another resource unit below the average utilization level of the reference resource unit. This helps for example the VIC to precisely determine the influence of a reference resource unit on the other resource unit and enabling a fast determination of the resource units being impacted preferably above a certain pregiven level. Further for example the VIC or any other relevant control and management entity may only use the algebraic sign of the RRAS for administering the resources for the virtual machines.

According to a further preferred embodiment the AS is based on successive RRAS values compared with utilization values for a reference resource unit. This allows for example by plotting of successive RRAS values against the specific utilization values of a reference unit to provide a simple and efficient way for deriving an AS. In case there are multiple RRAS values for a certain utilization level or range of the reference resource unit then the average RRAS value may be preferably considered as AS.

According to a further preferred embodiment the AS of different resource units are combined to determine long-term and/or short-term demands of a virtual resource using the resource units. This enables even further optimized decisions in performing management actions such as but not limited to virtual machine deployment and instantiation, virtual machine migration, virtual machine cloning, virtual machine scaling horizontal and/or vertical and/or run-time dynamic resource provisioning.

According to a further preferred embodiment a reassigning of resource units is performed temporarily for those resource units having a lower AS and/or RRAS in favor of resource units having a higher AS and/or RRAS. This has the advantage in particular of keeping virtual machine management operations transparent from the customer and/or user of the virtual machine by minimizing service disruptions.

FIG. 1 shows a part of a system according to a first embodiment of the present invention. In FIG. 1 a high-level view of a physical machine PM hosting multiple virtual machines of specific resource allocation is shown. Each virtual machine VM-x, VM-y, VM-z is hosting some application function AF and each virtual machine VM-x, VM-y, VM-z is allocated a specific slice 1, 2, 3, 4 or portion of the underlying physical resource units. In FIG. 1 the following resource units RU of a resource R, PM are considered: 1. CPU Processing (e.g., CPU cores); 2. Memory (e.g. RAM); 3. I/O module (e.g., Gigabit Ethernet NIC); and 4. Storage (e.g., local storage such as HDD).

The slices on each resource unit 1, 2, 3, 4 are denoted with x, y, z for the virtual machines: For instance $x_1$ indicates the slice for the virtual machine VM-x with the corresponding slice for CPU. For example $y_2$ indicates the slice for memory of the virtual machine VM-y and for example $z_3$ indicates the slice of the virtual machine VM-z in the input/output module.

Further the physical machine PM comprises a virtual machine monitor VMM. Here the virtual infrastructure controller agent VIC-agent which in general can be collocated or integrated with the virtual machine monitor VMM computes and maintains RRAS for all virtual machines VM-x, VM-y, VM-z on the physical machine PM and the results which are presented as RRAS-reports can be used locally to administer appropriate management actions within a physical machine PM such as runtime resource sharing or send the RRAS reports to the virtual infrastructure controller VIC to make appropriate management decisions. The virtual infrastructure controller agent VIC-agent can send the RRAS reports to the virtual infrastructure controller VIC either periodically or whenever solicited by the virtual infrastructure controller VIC or whenever a specified utilization threshold is exceeded. The virtual machine monitor VMM not only manages the virtual machines but ensures that each virtual machine VM gets the share of the stipulated resource R. As already mentioned above in FIG. 1 three virtual machines VM-x, VM-y, VM-z are assumed and the allocated size of the resource units denoted with reference sign 1, 2, 3, 4 to each virtual machine VM-x, VM-y, VM-z depends on the hosted application function requirement.

Each virtual machine VM-x, VM-y, VM-z will utilize its allotted share of the resource units 1, 2, 3, 4 in proportion to the incident workload, whereas the virtual machine monitor VMM ensures isolation between the allotted resource units 1, 2, 3, 4 for the different virtual machines VM-x, VM-y, VM-z.

Figure 2:
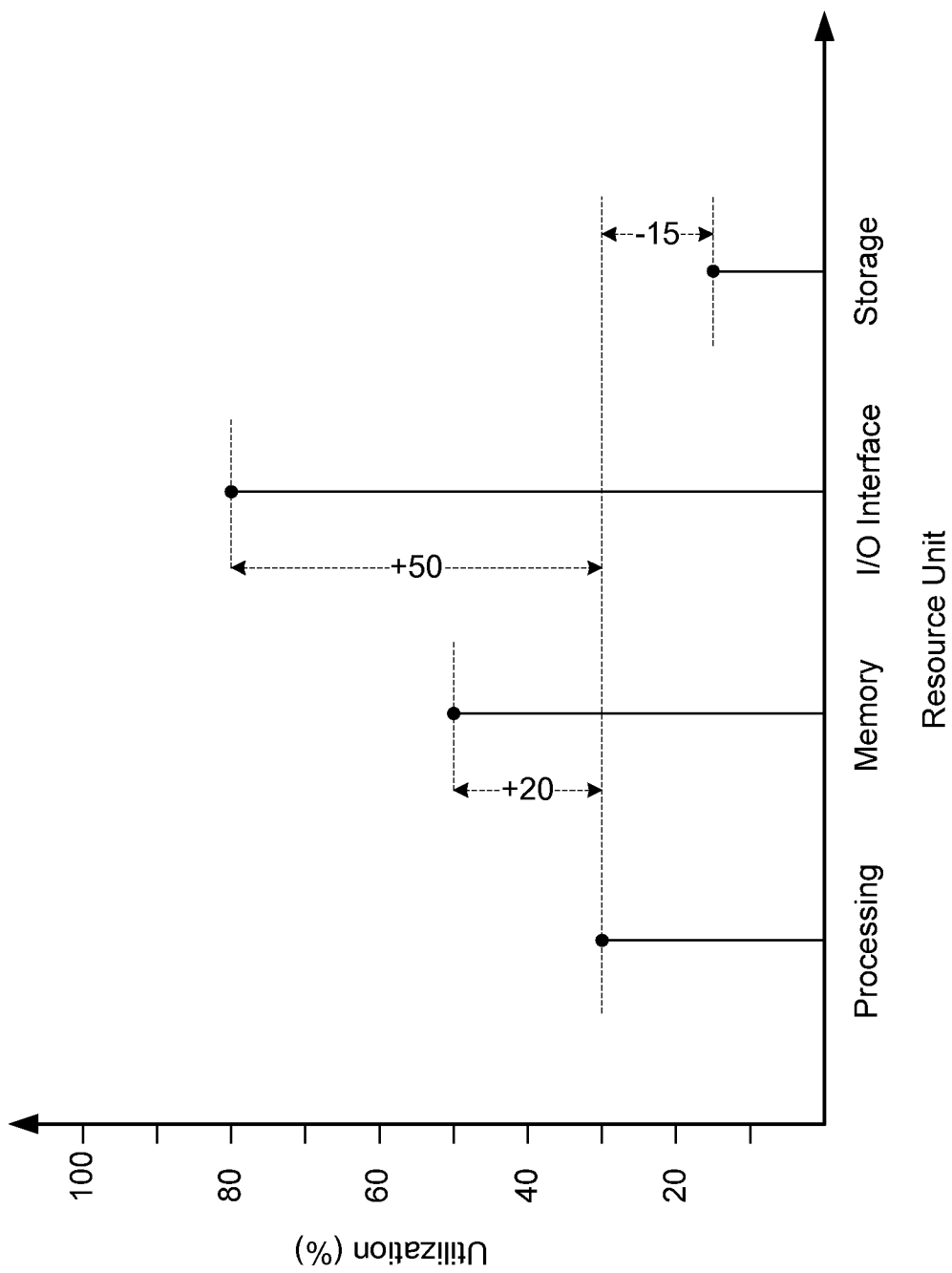
FIG. 2 shows resource utilizations of a virtual machine with the RRAS values with respect to the utilization of a processor of a system according to a second embodiment of the present invention.

As an example FIG. 2, shows the average percent utilization of each respective resource unit 1, 2, 3, 4 recorded over a specified time period $T=t_n-t_0$, where $t_0$ is the start and $t_n$ is the end of a monitoring epoch, for a single virtual machine VM-x, VM-y, VM-z. These values can be derived by the virtual infrastructure controller agent VIC-agent for each virtual machine VM-x, VM-y, VM-z using the resource monitoring function of the virtual machine monitor VMM. The accuracy of these utilization values are preferably dependent on the number of samples collected during the monitoring epoch and also on the sampling rate of the virtual machine monitoring VMM's monitoring function.

FIG. 2 shows resource utilizations of a virtual machine with the RRAS values with respect to utilization of a processor of a system according to a second embodiment of the present invention. In FIG. 2 a resource utilization for a specific virtual machine RRAS with respect to the resource unit CPU is shown. In FIG. 2 Processing has an average utilization value expressed in a percentage value of 30% whereas the memory has an average utilization value of 50% and the input/output interface has an average utilization value of 80% whereas storage has an average utilization value of 15%. Based on these individual scalar average values the virtual infrastructure controller agent VIC-agent can compute or derive a RRAS report for each virtual machine VM. The table below provides an example of the RRAS report corresponding to the utilization values of a specific virtual machine with the utilization values of FIG. 2:

| Reference Resource Unit | Absolute Average Utilization (%) | Reference Resource Affinity Score RRAS | | | |
|---|---|---|---|---|---|
| | | Processing | Memory | I/O Module | Storage |
| Processing | 30 | — | +20 | +50 | −15 |
| Memory | 50 | −20 | — | +30 | −35 |
| I/O Interface | 80 | −50 | −30 | — | −65 |
| Storage | 15 | +15 | +35 | +65 | — |

Based on the absolute average utilization values the virtual infrastructure controller agent VIC-agent computes the RRAS for each resource unit RU with reference to each other. Here in this case the RRAS value is the difference between the average utilization values of the resource units RU with the reference resource unit RU and this difference is considered as the RRAS value as shown in the table above. In the table above the resource unit RU of each row is a reference with respect to which the RRAS for other resource units RU are computed.

The RRAS values are vector quantities that not only show how much the utilization of the reference resource unit RU is impacting the respective resource units RUs but also how. A positive RRAS value of a particular resource unit RU indicates that the utilization of the reference resource unit RU will result in an increased utilization of the specific RU well above the level of utilization of the reference resource unit RU.

On the other hand a negative value indicates that the utilization of the reference resource unit RU will result in a decreased utilization of the particular resource unit RU well below the level of utilization of the reference resource unit RU. This will enable the VIC to precisely determine the influence of a reference resource unit RU on the other resource units RU. For instance, with reference to processing resource unit RU (e.g. CPU) it is observed from FIG. 1 that that 30% utilization of CPU will correspond to 50% of the utilization of the memory resource unit RU, 80% utilization of the I/O module resource unit RU and 15% utilization of the storage resource unit RU. Based on these individual utilization values, the RRAS values can be derived.

One simple method for deriving RRAS values could be to determine the absolute difference between the percentage utilization of the respective resource units RUs and the reference resource unit RU. For example, the first row in Table 1 indicates the RRAS values computed with reference to the Processing resource unit RU (i.e., the CPU). In this case the memory unit will have an affinity score of +20, I/O module+50 and storage −15. Similarly the second row shows the affinity of the individual resource unit RUs with respect to the memory, and so on.

The notion of deriving an "affinity score" indicates how strongly an individual resource unit RU correlates with the reference RU under specific workloads. Thus from the table above, it can be interpreted that the I/O module has the "strongest" affinity with the CPU with the RRAS value of +50, while the storage has the least affinity, which is −15. In other words, the I/O module will experience a higher degree of utilization than the storage with respect to CPU utilization. This could be typical of a virtual network function VNF hosted on the virtual machine VM that may perform packet forwarding and routing.

The virtual infrastructure controller agent VIC-agent continues to generate the RRAS reports by observing the resource unit RU values over a specified period of time T, and then computing the RRAS. The virtual infrastructure controller agent VIC-agent may be instructed by the virtual infrastructure controller VIC to derive/compute RRAS report with reference to a specific resource unit RU, or a subset of resource units RUs or all resource units RU with respect to each other. The resulting reports will correspond to such specifications.

The virtual infrastructure controller agent VIC-agent or preferably the virtual infrastructure controller VIC can also store and maintain the past RRAS reports for a specific resource unit RU or a set of resource units RU. The period of history can range from a couple of minutes, hours or even days, depending on the policy. Such historical/past record of the RRAS report enables the virtual infrastructure controller VIC or virtual infrastructure controller agent VIC-agent to derive an affinity signature AS of resource units RU with respect to a reference resource unit RU for the respective virtual machines VM. The AS provides the virtual infrastructure controller VIC or virtual infrastructure controller agent VIC-agent the information about the long term affinity of a resource unit RU with a reference resource unit RU for a specific virtual machine VM. An AS is a plot of the successive RRAS values against the specific utilization values of a reference resource unit RU. In case there are multiple RRAS values for a certain utilization level or utilization range of the reference resource unit RU then the average RRAS value may be preferably considered for the AS.

Figure 3:
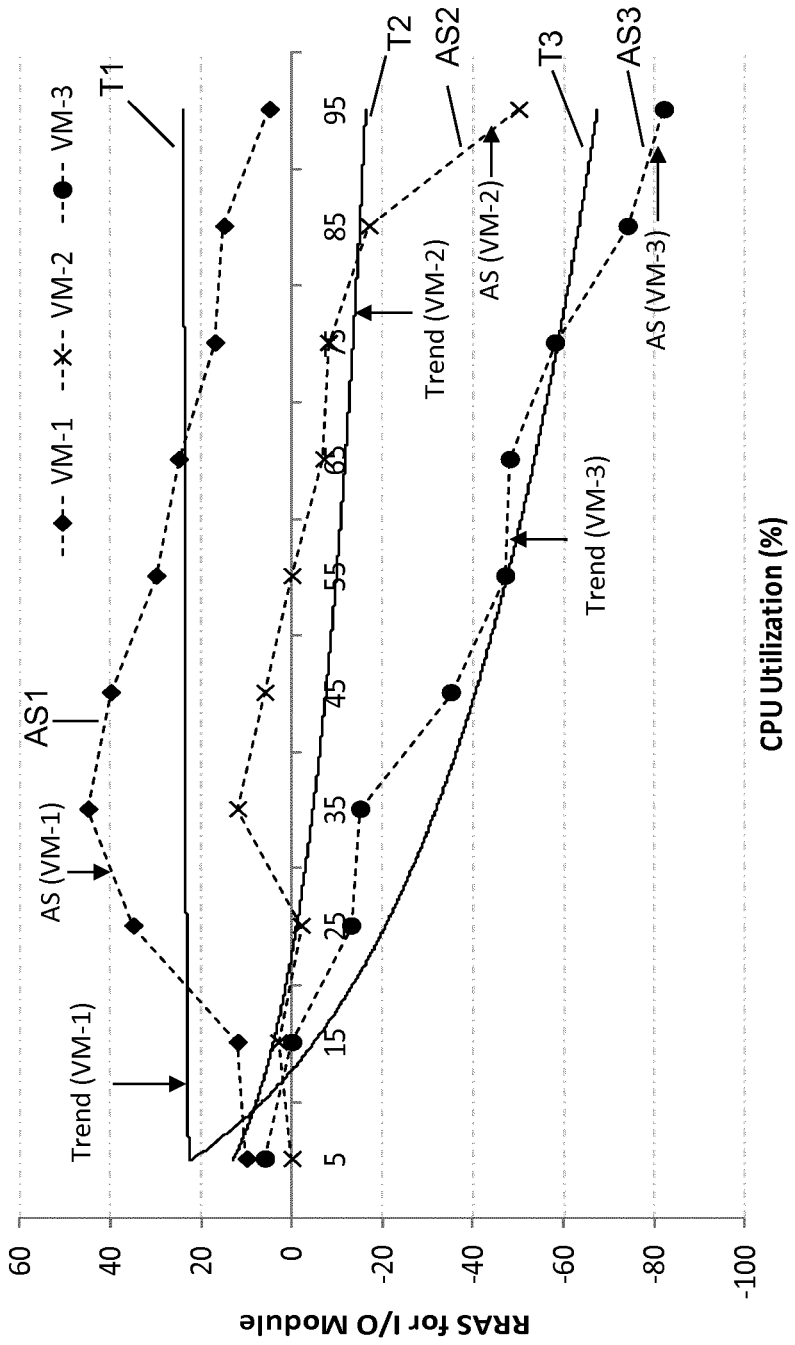
FIG. 3 shows schematically affinity signatures for different virtual machines of a system according to a third embodiment of the present invention.

FIG. 3 shows schematically affinity signatures for different virtual machines of a system according to a third embodiment of the present invention. In FIG. 3 the affinity signature for an input/output module resource unit with reference to the CPU resource unit based on RRAS reports is shown. In more detail in FIG. 3 statistics such as an affinity trend T1, T2, T3 is derived based on the information provided by RRAS reports and/or the affinity signature AS of the input/output modules of three virtual machines VM-1, VM-2 and VM-3 with reference to the processing resource unit, i.e. CPU.

The dotted lines AS-1, AS-2, AS3 indicate the affinity signature AS of the respective virtual machines VM-1, VM-2, VM-3 while the solid lines T1, T2, T3 indicate the logarithmic trend of the affinity of I/O with the CPU. As evident from this figure, the I/O module of virtual machine VM-1 shows a consistently strong long-term affinity with the CPU, which is indicated by the almost constant trend T1 on the positive axis. This indicates that the utilization of the I/O module is highly dependent on the utilization of the CPU such that high CPU utilization will incur high utilization of the I/O module.

On the other hand, the long-term affinity T2, T3 of virtual machine VM-2 and virtual machine VM-3 are not very strong, with virtual machine VM-3 being the weakest. This is indicated by the decaying trend T2, T3 of the affinity signature AS in the negative axis. This indicates that the utilization of the I/O resources for VM-2 and VM-3 is not significantly impacted as the CPU utilization increases. This could imply non-I/O intensive application functions AF hosted on the virtual machine VM-2 and virtual machine VM-3 while virtual machine VM-1 hosting an I/O intensive application function AF.

The affinity signature AS of different resource units RUs can be combined to determine the short-term and long-term demands and behavior of an application function AF. The information thus derived from the affinity signature AS can be utilized by the virtual infrastructure controller VIC in making short term and/or long term informed and optimized decisions in performing management actions such as, but not limited to: 1. VM deployment and instantiation; 2. VM migration; 3. VM cloning; 4. VM scaling horizontal and/or vertical; and 5. Run-time dynamic resource provisioning In another embodiment, the time of day ToD can also be included in the RRAS reports and the affinity signature AS graph to indicate the times at which the affinity is the strongest or weakest. This can help to enable a further optimum management of resources at different ToD. For example, a routing virtual network function VNF may be considered where the affinity signature AS indicates a strong affinity of the I/O resource unit RU and weak affinity of the memory resource unit RU during specific ToDs when the routing virtual network function VNF is involved in routing/forwarding user plane (U-plane) data traffic. Considering that for machine-to-machine (M2M) applications the control plane (C-plane) traffic exceeds the U-plane traffic, thereby imparting a higher demand on memory resource unit RU (for maintaining states) than on I/O RU. Therefore rerouting for the machine-to-machine (M2M) traffic over this routing virtual network function VNF may be provided to maximally utilize the available resources. Additionally the affinity signature AS information can also be used for power savings, where the virtual network function VNFs indicating weaker affinity to allotted resources can be consolidated on fewer servers thereby preserving resources and energy.

As another example embodiment, the RRAS-reports and/or the affinity signature AS graph can be used by the virtual machine monitor VMM in making local management decisions, such as the (re)allocation/(re)distribution of underutilized resources, i.e. resource black-holes allocated to another virtual machine VM within the physical machine PM. For example, with reference to the AS graphs shown in FIG. 3, since the I/O module slice allocated to VM-3 shows a lower affinity to the allotted CPU slice, therefore the virtual machine monitor VMM can re-allocate/re-distribute a portion of the I/O module resource slice allotted to virtual machine VM-3 in favor of VM-1 to enhance VM-1's I/O resource profile, and hence I/O performance. Thus the resource black-holes within the physical machine PM can be utilized locally to its optimum by taking into account the RRAS values and the affinity signature AS information.

This re-allocation/re-distribution of the portion of the resource unit RU with lower affinity can be temporary, during which time the virtual infrastructure controller VIC can make long term resource arrangements for the needy virtual machine VM (i.e., virtual machine VM-1) by, for instance, instantiating a copy of the virtual machine VM-1 instance to a different physical machine PM that can guarantee required resources on a long term basis and then releasing the resource unit RU back to its original owner (virtual machine VM-3) when all the state/content/context transfers have taken place to the new location of virtual machine VM-1. This has the advantage of keeping the virtual machine VM management operation transparent from the customer and/or user of the virtual machine VM while minimizing service disruptions. The re-allocation/re-distribution of the portion of the resource unit RU with lower affinity can also be on long term basis, depending on the policy.

The affinity signature AS of the resource units RU can also be used in performing cloud/data center DC infrastructure resource analytics. It can be utilized by the machine learning algorithms/methods in formulating effective future actions. The proposed method/system can also be utilized by performing efficient task scheduling as well as load balancing.

Figure 4:
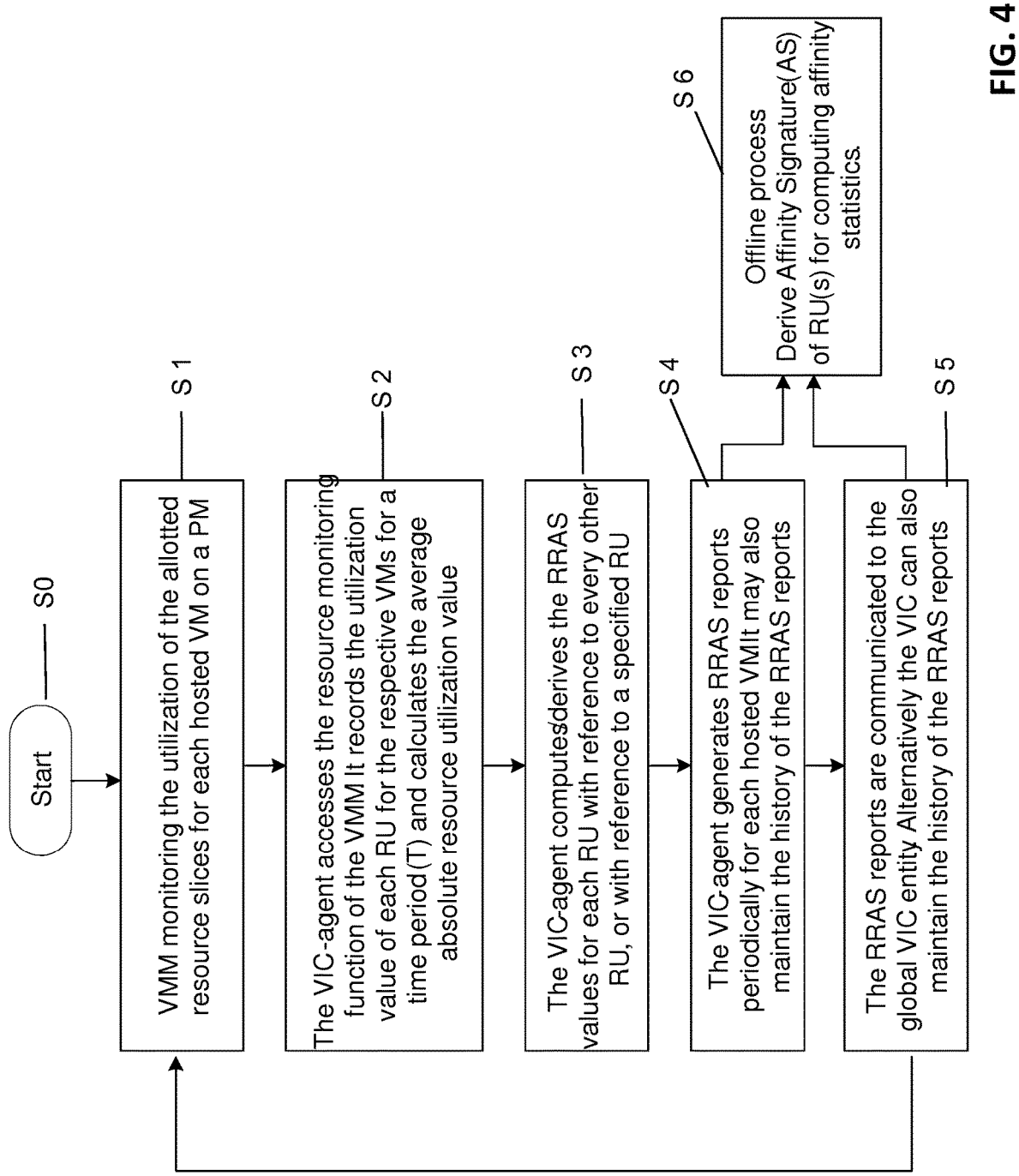
FIG. 4 shows steps of a method according to a fourth embodiment of the present invention.

FIG. 4 shows steps of a method according to a fourth embodiment of the present invention. In FIG. 4 an overview of the functional steps required for carrying out an embodiment of the invention is shown. In an initial step S0 the method shown in FIG. 4 is started. In a first step S1 the virtual machine monitor VMM monitors the utilization of the allotted resource slice for each hosted virtual machine VM on a physical machine PM. In a second step S2 the virtual infrastructure controller agent VIC-agent accesses the resource monitoring function of the virtual machine monitor VMM. It records the utilization value of each resource unit RU for the respective virtual machines VM for a time period T and calculates the average absolute resource utilization value. In a third step S3 the virtual infrastructure controller agent VIC-agent computes or derives the RRAS values for each resource unit RU with reference to every other resource unit RU with reference to a specified resource unit RU. In a fourth step S4 the virtual infrastructure controller agent VIC-agent generates RRAS reports periodically for each hosted virtual machine VM. It may also maintain the history of the RRAS reports. In a fifth step S5 the RRAS reports are communicated to the global virtual infrastructure controller entity. Alternatively a virtual infrastructure controller VIC can also maintain the history of the RRAS reports. In a sixth step S6 in an offline process the affinity signature AS may be derived of resource units RU for computing affinity statistics.

Figure 5:
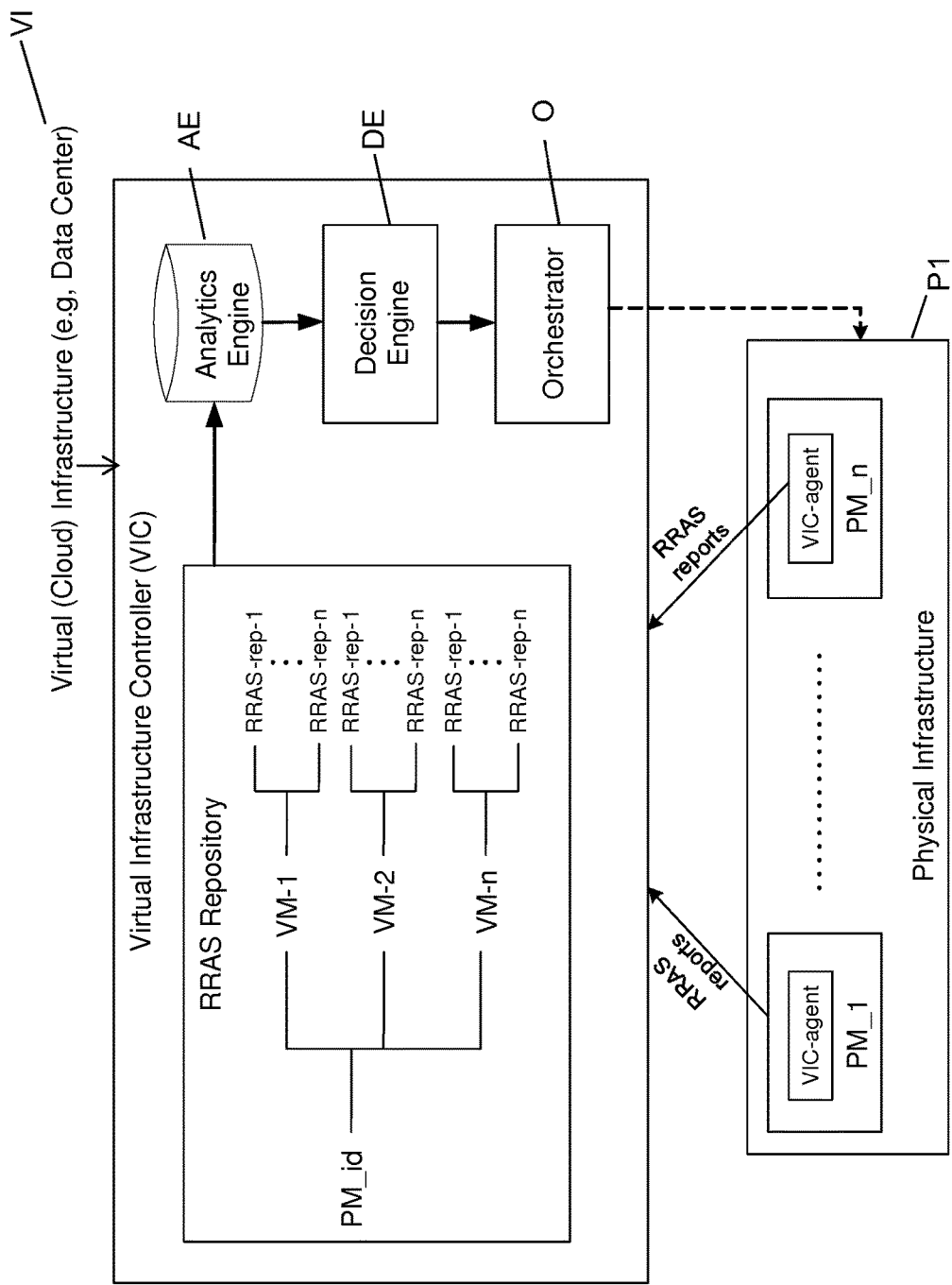
FIG. 5 shows a virtual infrastructure controller of a system according to a fifth embodiment of the present invention.

FIG. 5 shows a virtual infrastructure controller of a system according to a fifth embodiment of the present invention. In FIG. 5 a conceptual schematic overview of the virtual infrastructure controller VIC comprising the RRAS repository is shown. As illustrated in FIG. 5, the physical machines PM_1, . . . , PM_n communicate the RRAS reports via the virtual infrastructure controller agent VIC-agent towards a virtual infrastructure controller VIC, which are then stored in the corresponding RRAS repository RRAS-rep-1, . . . , RRAS-rep-n for the virtual machine VM-1, . . . , VM-n in the virtual infrastructure controller VIC. The RRAS repository is a data structure that maintains the history of the RRAS reports for each physical machine PM within the virtual infrastructure VI. The stored RRAS reports accessible via a RRAS-rep-id, where the id can be an integer value or ToD, can be referenced based on a unique VM-id, which in turn can be referenced based on the physical machine PM_id. The RRAS reports are analyzed by the Analytics Engine AE for deriving AS and other necessary statistics, which are then fed to the Decision Engine DE. Based on the output of the Analytics Engine AE the Decision Engine DE makes specific virtual infrastructure management decisions, which are communicated to the Orchestrator O for carrying out necessary actions to enforce the decisions.

For example, the Analytics Engine AE can derive the AS similar to the one shown in FIG. 3 based on the RRAS reports in the RRAS repository RRAS-rep-1, . . . , RRAS-rep-n. The Analytics Engine AE then pushes the derived AS to the Decision Engine DE, which can compute necessary statistics on the AS, and based on that will determine a specific action or set of actions. The statistics can also be determined by the Analytics Engine AE. The action space computed by the Decision Engine DE may include, but not limited to, VM migration, cloning, vertical/horizontal scaling, e.g. scale-in or scale-out, resource re-allocation/re-distribution etc. The Decision Engine DE when determining the appropriate action or set of them may also take into consideration operator's policy and constraints depending on the type of AF and the SLA etc.

With specific reference to FIG. 3, considering the strong long term affinity of the I/O resource unit RU with the CPU for virtual machine VM-1, the Decision Engine DE may decide to migrate and deploy virtual machine VM-1 on a different physical machine PM that can offer higher I/O capacity than the existing physical machine PM, and which can also take care of unexpected throughput surges. The Decision Engine DE will convey its preferred decision to the orchestrator O, which is then responsible to implement/enforce the decision of the Decision Engine DE by managing the process of locating the appropriate physical machine PM and then migrating virtual machine VM-1 to its new location with minimum service interruption. To ensure minimum service disruption, the orchestrator O may vertically scale-up the I/O resource unit of virtual machine VM-1 by temporarily re-allocating the unutilized portion of the I/O resource unit RU assigned to virtual machines VM-2 and VM-3 to virtual machine VM-1 till the time the virtual machine VM-1 migration process is completed and virtual machine VM-1 becomes accessible on the new physical machine PM. All the supplementary tasks that may arise due to virtual machine VM-1 migration, such as state/context transfer, adjusting routing rules within data center DC to ensure that flows get diverted to the new location of the virtual machine VM-1, are also handled by the orchestrator O.

In summary the present invention preferably renders greater precision to the ability of a local virtual infrastructure management entity, e.g., VIC-agent and/or a global virtual infrastructure management entity, e.g., VIC in exercising virtual infrastructure management decisions by computing/deriving Reference Resource Affinity Score RRAS vector values for every virtual machine VM hosted on a physical machine PM, in particular by providing the following:
  a) The RRAS values are computed by a VIC or VIC-agent based on the resource utilization levels monitored by the VMM over a specific time period T.
  b) RRAS values enable the cloud infrastructure management entity to get a fine granular and precise view of the degree of affinity or correlation of a resource unit RU or a plurality of resource units RUs with a reference resource unit RU.
  c) Generating Affinity Signature AS for resource units RU derived from past successive RRAS reports providing information about long term affinity of resource units RU with a reference resource unit RU.
  d) Any resource unit RU can be used as a reference against which to compute/derive RRAS vector values and AS of a specific resource unit RU or a set of resource units RUs, depending on the virtual infrastructure operator policy.

Further the present invention enhances the precision of the decision making abilities of the VIC and the VIC-agent for making optimum decisions regarding virtual machine management tasks such as placement/deployment, instantiation, resource management, migration, cloning, scaling, e.g. vertical and/or horizontal etc. Furthermore it enables to derive statistics for making short-term and long-term virtual machine management decisions.

The present invention even further provides a flexible approach where the RRAS reports and the AS can be computed with reference to any resource unit RU depending on the virtual infrastructure, i.e. data center or the like, operator control/management policy as well as provides a diverse while simple approach for application to large-scale and/or distributed data center virtual infrastructures.

In particular the present invention includes, enables or provides the following
  1. The ability of a VIC or VIC-agent to derive Reference Resource Affinity Score RRAS vector values of the plurality of resource units based on monitored values for each individual virtual machine VM hosted on a physical machine PM.
  2. Ability of the VIC-agent to communicate RRAS reports to the central/global VIC.
  3. Ability of the system to generate Affinity Signature AS for the plurality of resources or for specified resources based on the history of the RRAS reports.

The present invention has inter alia the following advantages:
  1. Enables to perform precise and fine-granular resource tailoring.
  2. Utilization of the resource black-holes by means of re-allocation/re-distribution of local resources among the virtual infrastructures.
  3. Ensure against the rigid pinning of resources to specific virtual machine instances.
  4. Enable the optimum utilization of the assigned and available resources.
  5. Enable the optimum (re)assignment, (re)distribution, (re)allocation and/or (re)organization or sharing of resources amongst multiple virtual machine instances on the same physical machine at run-time.
  6. Minimize the occurrence of the triggering of costly virtual machine management operations (e.g., migration, Vertical/Horizontal scaling, cloning etc) by the VIC.
  7. Enhancing the capabilities of Data Center/cloud resource analytic algorithms/methods by providing a precise correlation between different resource units.
  8. Maintains the QoS by making the management actions, such as virtual machine migration, transparent from the users.
  9. Enable both local management and global management actions, depending on whether the management action is executed locally by the VIC-agent or by the global VIC entity.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for operating a virtual network infrastructure, wherein a corresponding physical infrastructure comprises one or more physical infrastructure resources, the physical infrastructure resources being physical or virtual, the method comprising:
monitoring utilization levels of one or more resource units of the one or more physical infrastructure resources for virtual resources requesting the one or more resource units;
calculating average absolute resource utilization values based on the utilization levels for each of the virtual resources;
calculating a reference resource affinity score (RRAS) for each of the one or more resource units of the one or more physical infrastructure resources, wherein the RRAS indicates an impact of the utilization of a first reference resource unit on the utilization of additional resource units on one or more additional physical infrastructure resources using the calculated average absolute resource utilization values, wherein calculating a reference resource affinity score (RRAS) is performed only for specific physical infrastructure resources and/or resource units;
generating a RRAS report including the utilization levels of the resource units on the respective physical infrastructure resource for one or more virtual resources;
storing a history of generated RRAS reports; and
assigning resources by a virtual infrastructure controller (VIC) and/or a VIC-agent on a resource, based on the at least one of the RRAS for the virtual resources and the history of generated RRAS reports.

2. The method according to claim 1, wherein the utilization levels are recorded over a certain adaptable time period.

3. The method according to claim 1, wherein the RRAS report includes the utilization levels of the one or more resource units on a respective physical infrastructure resource for all the virtual resources.

4. The method according to claim 3, wherein the history of the RRAS reports is maintained in each physical infrastructure resource and/or transmitted to the virtual infrastructure controller (VIC), wherein the RRAS-reports are stored in a RRAS-repository inside the VIC.

5. The method according to claim 1, wherein an affinity signature (AS) for one or more resource units (RU) is calculated based on actual and historical RRAS, wherein the affinity signature indicates a long-term trend of the affinity of a resource unit for a corresponding virtual resource.

6. The method according to claim 5, wherein assigning resources by a virtual infrastructure controller is performed based on one or more affinity signatures.

7. The method according to claim 1, wherein a time indication is attached to the RRAS and/or the affinity signature when calculating the RRAS and/or the affinity signature.

8. The method according to claim 3, wherein the RRAS-reports are provided periodically and/or event-based.

9. The method according to claim 1, wherein a RRAS is calculated by using a difference between an average absolute resource utilization for a reference resource unit and an absolute resource utilization of another resource unit.

10. The method according to claim 1, wherein a RRAS is calculated by using an absolute difference between a percentage utilization for a reference resource unit and a percentage utilization of another resource unit.

11. The method according to claim 1, wherein the RRAS indicates how utilization of a reference resource unit impacts utilization of other resource units on a physical infrastructure resource.

12. The method according to claim 1, wherein a positive value for a RRAS of a reference resource unit indicates that utilization of the reference resource unit will result in an increased utilization of another resource unit above the average utilization level of the reference resource unit, and
wherein a negative value for a RRAS of a reference resource unit indicates that utilization of the reference resource unit will result in a decreased utilization of another resource unit below the average utilization level of the reference resource unit.

13. The method according to claim 5, wherein the affinity signature is based on successive RRAS values compared with utilization values for a reference resource unit.

14. The method according to claim 5, wherein the affinity signature of different resource units are combined to determine long-term and/or short-term demands of a virtual resource using the resource units.

15. The method according to claim 1, wherein a reassigning of resource units is performed temporarily for resource units having a lower affinity signature and/or RRAS in favor of resource units having a higher affinity signature and/or RRAS.

16. A system for operating a virtual network infrastructure, the system comprising:
a processor; and
a non-transitory computer readable medium storing instructions, that when executed by the processor, cause the system to perform steps comprising:
monitoring utilization levels of one or more resource units of the physical infrastructure resources for virtual resources requesting the resource units;
calculating average absolute resource utilization values based on the utilization levels for each virtual resource;
calculating a reference resource affinity score (RRAS) for each resource unit, wherein the RRAS indicates an impact of utilization of a first reference resource unit on the utilization of additional resource units on one or more additional physical infrastructure resources, using the average absolute resource utilization values, wherein calculating a reference resource affinity score (RRAS) is performed only for specific physical infrastructure resources and/or resource units;
generating a RRAS report including the utilization levels of the resource units on the respective physical infrastructure resource for one or more virtual resources;
storing a history of generated RRAS reports; and
assigning resources by a virtual infrastructure controller (VIC) and/or a VIC-agent on a resource, based on the at least one of the RRAS for the virtual resources and the history of generated RRAS reports.

* * * * *